United States Patent [19]

Phillips

[11] Patent Number: 5,689,823
[45] Date of Patent: Nov. 18, 1997

[54] RADIO HAVING AN OPTION BOARD INTERFACE AND AN OPTION BOARD FOR USE THEREWITH

[75] Inventor: Joseph E. Phillips, Huntley, Ill.

[73] Assignee: Motorola, Inc., Schaumburg, Ill.

[21] Appl. No.: 391,907

[22] Filed: Feb. 21, 1995

[51] Int. Cl.$^6$ .................................................. H04B 1/38
[52] U.S. Cl. ............................ 459/89; 455/90; 455/186.1
[58] Field of Search ............................. 455/84, 89, 90, 455/186.1, 185.1, 349; 379/58, 59

[56] References Cited

U.S. PATENT DOCUMENTS

| | | | |
|---|---|---|---|
| 5,335,276 | 8/1994 | Thompson et al. | 455/186.1 |
| 5,353,328 | 10/1994 | Jokimies | 455/89 |
| 5,404,580 | 4/1995 | Simpson et al. | 455/89 |
| 5,418,837 | 5/1995 | Johansson et al. | 455/186.1 |
| 5,465,401 | 11/1995 | Thompson | 455/90 |

*Primary Examiner*—Edward F. Urban
*Attorney, Agent, or Firm*—Frank M. Scutch, III; Steven G. Parmelee

[57] ABSTRACT

A radio transceiver system (100) includes an option board interface (117) with an analog interface (119) and a digital interface (125). Option board interface (117) is used for conveying information between an optional memory board (133) and a digital processing unit (105). Option board interface (117) also controls analog audio functions through analog interface (119). Option board interface (117) enhances functional operation of the radio transceiver system (100) by allowing options to be selected which are not provided as standard radio equipment.

15 Claims, 3 Drawing Sheets

RADIO HAVING AN OPTION BOARD INTERFACE AND AN OPTION BOARD FOR USE THEREWITH

TECHNICAL FIELD

This invention relates in general to radios and more particularly to an interface for controlling radio options.

BACKGROUND OF THE INVENTION

Radios are well known in the art. As radio systems become increasingly complex, so to are the radios that operate in those systems. The users of such radios of course, also remain interested in obtaining inexpensive equipment.

Depending on their needs, many customers require a low cost radio product that still has many optional features. Manufacturers often have a difficult time meeting customer demands by making an inexpensive two-radio with a standard complement of features that will meet average customer needs. A way to lower radio cost to the consumer is to remove any optional features from the radio. Some of these features may relate to operational characteristics of the radio that may aid an operator in its use. Other features may enable the radio to be used in different system environments such as selective calling, voice security, or low cost trunking.

In many instances, providing a radio with enhanced functionality will increase the cost of the radio to the user. Because of this, many users wish to procure radios that include only functionality that is relevant to their particular system, to thereby avoid paying for unneeded functionality. To meet this need, many users purchase basic radio platforms, and then seek to subsequently modify those platforms to introduce the added functionality that they require. Therefore, one way to provide enhanced features above those included with the standard low cost radio is to build in the capability for the radio to be easily upgraded.

Modifying or upgrading a radio can take many forms, however an easy way to enable the radio to utilize additional features is through the use of an option board. The option board includes specific hardware and software components that enable the radio to perform accessory functions. A user may select a particular option board depending on their requirements. Thus, this technique allows the option board to be used to enhance the operational capability of the basic radio without severely impacting the radio's overall cost.

After-market option boards or upgrade modules are manufactured by communications manufacturers to provide those features not offered by the basic radio. On occasion, these upgrade modules have difficulties in either physically or operationally interfacing with the radio. One problem involves hardware installation requiring soldering of wires to various printed circuit boards in the radio. Wires are often soldered at locations to the printed circuit board or discrete component that was not intended to be altered or modified. This can have the effect of voiding the radio manufacturer warranty. Also, the installation of these modules can actually disable the radio making it either inoperable or partially inoperable. Modern radios are relatively sophisticated devices, and include both analog and digital signaling paths. It can be difficult to properly and reliably interface with such analog and digital paths, and this difficulty can again lead to improper functionality.

Since there is difficulty in connecting many types of option boards to the internal radio circuitry, the need exists to provide an interface that is capable of interpreting the type of board and conveying its information to an internal microprocessing unit. This would avoid the cumbersome task of having to hardwire various connections within the radio depending on the options board that is selected.

DETAILED DESCRIPTION OF THE PREFERRED EMBODIMENT

Figure 1:
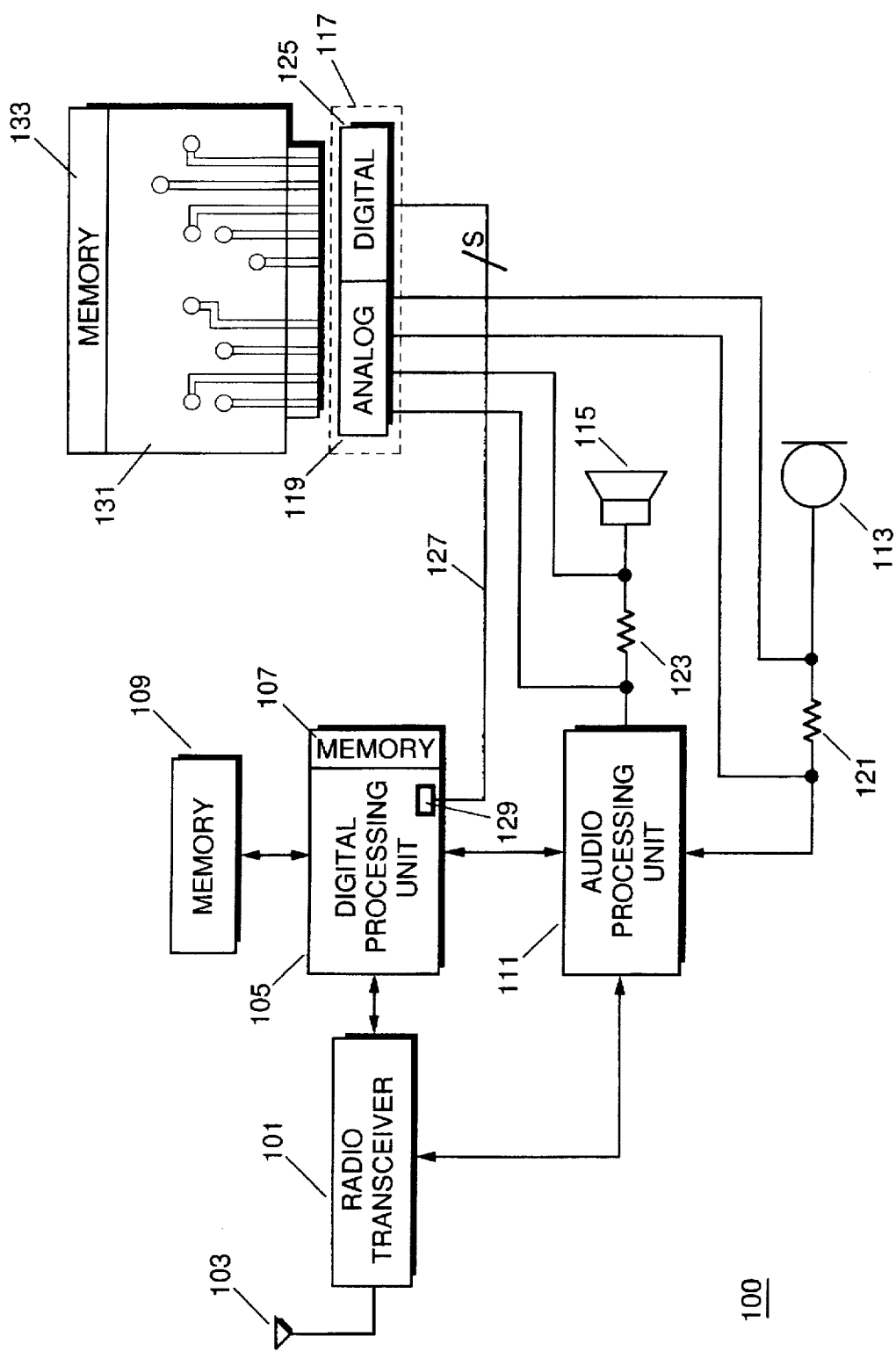
FIG. 1 is a block diagram showing a radio having an option board interface and an option board as configured with the present invention.

Referring now to FIG. 1, a radio transceiver system 100 includes a radio transceiver 101 attached to an antenna 103. A digital processing unit 105 is further connected to the radio transceiver 101 and operates to control instructions and control data to and from the radio transceiver 101. A digital processing unit 105 includes an on-board digital processing unit memory 107 that is used to store and convey system control data to a digital processing unit memory 107. The digital processing unit memory 107 may also convey data to and from external peripheral devices that may be connected to or use data stored in the digital processing unit memory 107. The digital processing unit memory 107 includes one or more operating protocols. These operating protocol operate using a plurality of addresses that uniquely correspond to both radio function and status information which are used on the radio transceiver 101 as well as that of the option board 131 described hereinafter.

An external memory 109 may also be connected to the digital processing unit 105 and is used to convey or store data and or control operating instructions for use by the digital processing unit 105. Optimally, both the digital processing unit memory 107 and the external memory 109 will contain both read only memory (ROM) and an electronically erasable programmable read only memory (EEPROM) having the advantage of being non-volatile. Since the external memory 109 is external to the digital processing unit 105, it generally will be a greater capacity. The ROM is used to store the operating protocol while the EEPROM portions of the memory are used to store customer configuration instructions. Customer configurations may include individual IDs, call response definitions and/or special options related to a unique option board requirement.

An audio processing unit 111 is a unit to convey information both to and from the radio transceiver 101 and the digital processing unit 105. The audio processing unit 111 receives an analog signal input from a microphone 113 and conveys analog signals output to a speaker 115. Both the microphone 113 and the speaker 115 are operably coupled to an audio processing unit 111 and to analog interface 119 of option board interface 117. It will be recognized by those skilled in art that the above described components are all well understood in the art, and hence no further description need by provided here.

In order to allow the digital processing unit 105 to provide additional operational functions and options to the radio transceiver 101, an option board interface 117 is included. The option board interface 117 utilizes an analog interface 119 that is connected in parallel with a microphone load resistor 121 and a speaker load resistor 123. Both the microphone load resistor 121 and speaker load resistor 123 are used as resistive inputs to complement respective summing amplifiers (not shown). The analog interface 119 may be used to control the physical connections made between the audio processing unit 111, microphone 113 and speaker 115.

Similarly a digital interface 125 is used for supplying digital information through a serial bus 127 which provides an interface to digital processing unit 105. The digital processing unit 105 includes a serial bus port 129 for interfacing i.e. transmitting and receiving data and operating instructions to the serial bus 127. Transmission of radio operating status information is sourced by the digital processing unit 105 through serial bus 127.

The option board interface 117 is sized and configured to accommodate an external option board 131. The option board interface 117 can be physically comprised of a printed circuit board card edge connector or the like. The printed circuit board card edge connector (not shown) is capable of receiving a printed circuit board and having electrical conductors that come into conductive contact with conductive traces on the printed circuit board itself, all as is well understood in the art. The external option board 131 includes option board memory 133 which often takes the form of a printed circuit board card or the like. The external option board 131 is used to store data and operational instructions that are to be used to control the radio transceiver 101 during the period user selected options are used. In operation, the external option board 131 is plugged into the option board interface 117 where the operating instructions and data stored in the option board memory 133 are used, with memory stored in digital processing unit memory 107, to operate the radio transceiver 101 in accordance with the selected option.

During operation and at start-up, operating instructions are conveyed to the option board memory 133 from the digital processing unit memory 107, that gives the option board control information on how to proceed, to utilize its specific option with the digital processing unit 105. Afterward, data concerning the particular option is conveyed to the digital processing unit memory 107 through the option board interface 117 over the serial bus 127. A continuous exchange of information is then possible to insure correct control and operation of the radio transceiver 101 when utilizing the specific radio option or options contained on the external option board 131. The option board 131 could also have, as appropriate to meet the needs of a particular application, other components and elements. For example, if a particular option board were intended to allow an analog signal to be scrambled prior to transmission, the option board 131 would include appropriate circuitry to receive the analog input from the microphone and scramble it in accordance with the desired scrambling methodology.

Figure 2:
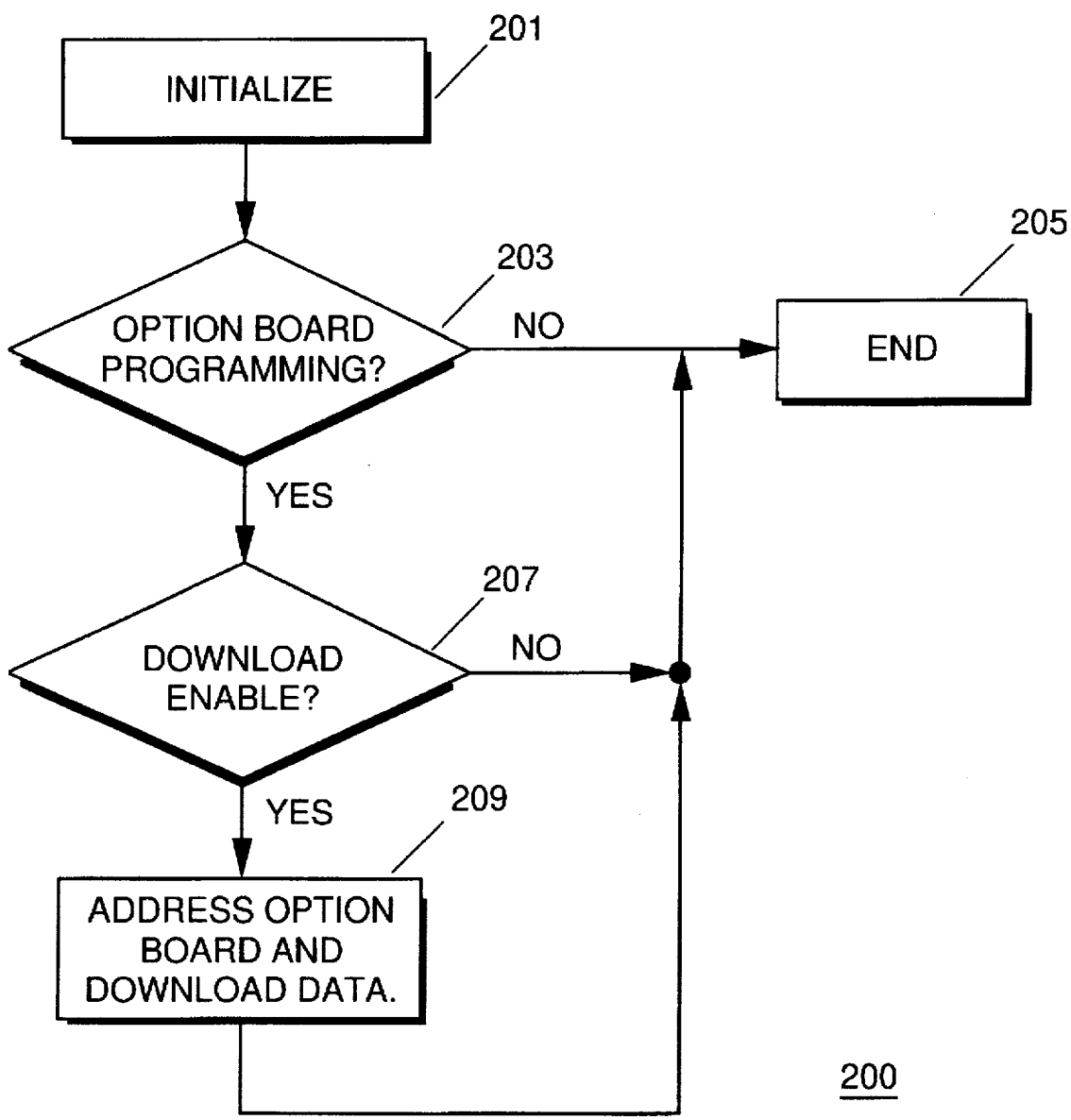
FIG. 2 is a flow chart showing operation of a radio that is configured in accordance with the invention.

FIG. 2 shows a flow chart 200 depicting the operation of radio transceiver system 100 during initial start-up. When radio transceiver system 100 is first actuated, the digital processing unit first initializes 201 and a determination is made 203 if option board programming is available. The option board programming is customized to fit a specific user application. The customized operating instructions are stored in the digital processing unit memory to take advantage of the non-volatile EEPROM available. If no programming is available, the digital processing unit continues normally and no option programming information is available 205. If option board programming is available, a download enable command is conveyed 207 from the digital processing unit and digital processing unit memory to address 209 the option board.

After addressing, the operating instructions are down loaded 209 back to the option board for use. It will be recognized by those skilled in the art that in order for digital processing unit 105 to initiate a configuration which downloads to option board 131 at power-up, it must instruct serial bus port 129 to address the option board on serial bus 127. Next, the digital processing unit 105 instructs the serial bus port 129 to download data over the serial bus 127. After the download is complete, the digital processing unit 105 instructs the serial bus port 129 to deaccess the option board 131 so that other devices on the serial bus 127 can be accessed as needed by normal radio processing.

Figure 3:
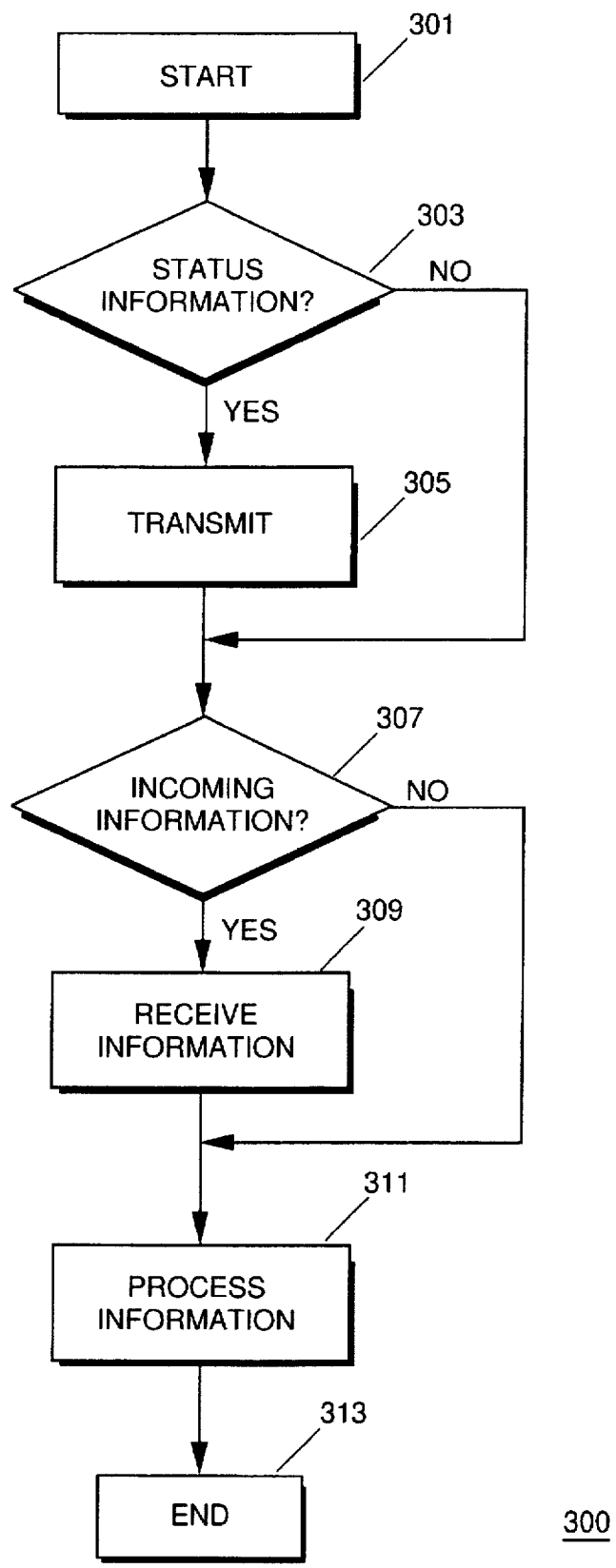
FIG. 3. is a flow chart showing operation of a radio that is configured in accordance with the invention during the period the radio is in operation.

FIG. 3 shows a flow chart 300 depicting the operation of radio transceiver system 100 during operation and use of a selected option board. During this process, a continuous hand-shaking or exchange of data and information occurs between the digital processing unit and the option board. After this process has started 301, both the digital processing unit and the option board use this process to convey data between each other. During this process, both the digital processing unit and option board determine 303 if status information or operating instructions are to be exchanged. If there is information, this is transmitted to the respective device. If no information is present, both the digital processing unit and option board look to determine 307 if incoming information is present. If there is incoming information, this information and/or operating instructions are received 309. If there is no incoming information, any information that was received or is present is processed 311.

Once any available information is processed, this segment of the process ends 313 and the process begins 301 anew as long as the option board is being used. It will also be recognized by those skilled in the art, the when the option board 131 needs to send control information and/or poll digital processing unit 105 for radio status information, option board 131 instructs digital interface 125 to send an option board request for transfer to digital processing unit 105. Upon detecting the option board request, the digital processing unit 105 instructs serial bus port 129 to initiate a transfer of serial information with option board 131. In order to begin the transfer, serial bus port 129 must address option board 131. After the option board 131 is addressed, the transfer of status information to the option board 131 and/or radio control information from option board 131 is initiated.

After the transfer is complete digital processing unit 105 instructs the serial bus port 129 to deaccess option board 131 so that other devices on serial bus 127 can be accessed as needed by normal radio processing. The digital processing unit 105 then processes the radio control information from option board 131. Control information from option board 131 can include data such as audio interface control instructions, channel selection, and radio key or dekey requests.

When a radio status change is detected by digital processing unit 105, it instructs serial bus port 129 to initiate a transfer of serial information with option board 131. Radio status changes may include channel changes, squelch status change, user switch actuation, coded squelch detect changes, and transmit status changes. This transfer includes radio status information from the digital processing unit 105 and/or radio control information from the option board 131. To begin the transfer, the digital processing unit 105 instructs serial bus port 129 to address the option board 131. After the option board 131 is addressed, the transfer of status information to the option board 131 and/or radio control information from the option board 131 is initiated. After the transfer is complete, the digital processing unit 105 instructs the serial bus port 129 to deaccess the option board 131. This allows other devices on the serial bus 127 to be accessed as needed by normal radio processing. The digital processing unit 105 then processes any radio control information received from option board 131. The status information that was sent to option board 131 can include data like carrier detect, coded squelch detect, push to talk switch pressed, user channel changes, and user switch actuations.

While the preferred embodiments of the invention have been illustrated and described, it will be clear that the invention is not so limited. Numerous modifications, changes, variations, substitutions, and equivalents will occur to those skilled in the art without departing from the spirit and scope of the present invention as defined by the appended claims.

What is claimed is:

1. A radio, comprising:
   A) a radio transceiver;
   B) a digital processing unit having:
      non-volatile programmable memory;
      a serial bus interface which is operably coupled to the radio transceiver;
      a memory having an operating protocol stored therein, wherein the operating protocol provides for:
         at least a first address that uniquely corresponds to at least a part of the radio transceiver; and
         at least a second address that uniquely corresponds to an option board;
   C) an audio processing unit operably coupled to the radio transceiver and to the digital processing unit;
   D) an option board interface constructed and arranged to interface with the option board, the option board interface having:
      an analog interface operably coupled to the audio processing unit; and
      a digital interface operably coupled to the serial bus interface.

2. The radio of claim 1, wherein the audio processing unit includes an analog audio output, and wherein the analog interface of the option board interface is operably coupled to the analog audio output.

3. The radio of claim 1, wherein the radio further includes a speaker that is operably coupled to the audio processing unit and to the analog interface of the option board interface.

4. The radio of claim 1, wherein:
   A) the audio processing unit includes an analog audio output, and wherein the analog interface of the option board interface is operably coupled to the analog audio output; and
   B) the radio further includes a speaker that is operably coupled to the audio processing unit and to the analog interface of the option board interface.

5. The radio of claim 1, wherein the audio processing unit includes an analog audio input, and wherein the analog interface of the option board interface is operably coupled to the analog audio input.

6. The radio of claim 1, wherein the radio further includes a microphone that is operably coupled to the audio processing unit and to the analog interface of the option board interface.

7. The radio of claim 1, wherein:
   A) the audio processing unit includes an analog audio input, and wherein the analog interface of the option board interface is operably coupled to the analog audio input; and
   B) the radio further includes a microphone that is operably coupled to the audio processing unit and to the analog interface of the option board interface.

8. The radio of claim 1, wherein:
   A) the audio processing unit includes an analog audio output, and wherein the analog interface of the option board interface is operably coupled to the analog audio output;
   B) the radio further includes a speaker that is operably coupled to the audio processing unit and to the analog interface of the option board interface;
   C) the audio processing unit includes an analog audio input, and wherein the analog interface of the option board interface is operably coupled to, the analog audio input; and
   D) the radio further includes a microphone that is operably coupled to the audio processing unit and to the analog interface of the option board interface.

9. The radio of claim 1, wherein the operating protocol further provides for transmission of radio operating status information as sourced by the digital processing unit through the serial bus interface.

10. The radio of claim 1, wherein the operating protocol further provides for reception, at the digital processing unit, of radio operating instructions as sourced by the option board through the serial bus interface.

11. The radio of claim 1, wherein the operating protocol further provides for:
   A) transmission of radio operating status information as sourced by the digital processing unit through the serial bus interface; and
   B) reception, at the digital processing unit, of radio operating instructions as sourced by the option board through the serial bus interface.

12. The radio of claim 1, wherein the non-volatile programmable memory comprises electronically erasable programmable read only memory.

13. A radio, comprising:
   A) a radio transceiver;
   B) a digital processing unit having:
      non-volatile programmable memory;
      a serial bus interface that is operably coupled to the radio transceiver;
      a memory having an operating protocol stored therein, wherein the operating protocol provides for:
         at least a first address that uniquely corresponds to at least a part of the radio transceiver; and
         at least a second address that uniquely corresponds to an option board;
   C) an audio processing unit having an analog audio input and an analog audio output, wherein the audio processing unit is operably coupled to the radio transceiver and to the digital processing unit;
   D) a speaker that is operably coupled to the analog audio output;
   E) a microphone that is operably coupled to me analog audio input;
   F) an option board interface constructed and arranged to interface with the option board, the option board interface having:
      an analog interface operably coupled to the analog audio input and the analog audio output of the audio processing unit, and to the speaker and the microphone; and
      a digital interface operably coupled to the serial bus interface.

14. An option board for use with a radio, which radio comprises:

a radio transceiver;

a digital processing unit having:
non-volatile programmable memory;
a serial bus interface that is operably coupled to the radio transceiver;
a memory having an operating protocol stored therein, wherein the operating protocol provides for:
at least a first address that uniquely corresponds to at least a part of the radio transceiver; and
at least a second address that uniquely corresponds to the option board;

an audio processing unit having an analog audio input and an analog audio output, wherein the audio processing unit is operably coupled to the radio transceiver and to the digital processing unit;

a speaker that is operably coupled to the analog audio output;

a microphone that is operably coupled to me analog audio input;

an option board interface constructed and arranged to interface with the option board, the option board interface having:

an analog interface operably coupled to the analog audio input and the analog audio output of the audio processing unit, and to the speaker and the microphone; and a digital interface operably coupled to the serial bus interface;

wherein the option board comprises:
A) a printed circuit board having connectors that are constructed and arranged to electrically and physically interface with the option board interface, wherein the connectors include:
at least one conductor that electrically connects to the analog audio input;
at least one conductor that electrically connects to the analog audio output;
at least one conductor that electrically connects to the speaker;
at least one conductor that electrically connects to the microphone;
at least one conductor that electrically connects to the digital interface.

15. The option board of claim 14, and further comprising a memory that includes the second address.

* * * * *